Feb. 4, 1964    M. CLARK, JR    3,120,636
ELECTRICAL POSITIONING DEVICE
Filed April 1, 1960    4 Sheets-Sheet 1

INVENTOR.
MELVILLE CLARK JR.
BY Charles Hieken
ATTORNEYS

Feb. 4, 1964   M. CLARK, JR   3,120,636
ELECTRICAL POSITIONING DEVICE
Filed April 1, 1960   4 Sheets-Sheet 2

INVENTOR.
MELVILLE CLARK JR.
BY Charles Hieken
ATTORNEYS

Feb. 4, 1964          M. CLARK, JR          3,120,636

ELECTRICAL POSITIONING DEVICE

Filed April 1, 1960                             4 Sheets-Sheet 3

*INVENTOR.*
MELVILLE CLARK JR.
BY *Charles Hicken*

ATTORNEYS

Feb. 4, 1964  M. CLARK, JR  3,120,636
ELECTRICAL POSITIONING DEVICE
Filed April 1, 1960  4 Sheets-Sheet 4

INVENTOR.
MELVILLE CLARK JR.
BY Charles Hicken
ATTORNEYS

United States Patent Office 3,120,636
Patented Feb. 4, 1964

3,120,636
ELECTRICAL POSITIONING DEVICE
Melville Clark, Jr., 17 Bellvue St., Newton, Mass.
Filed Apr. 1, 1960, Ser. No. 19,366
11 Claims. (Cl. 323—53)

The present invention relates in general to electrical positioning devices and more particularly concerns a novel electromechanical system for selectively positioning an element in accordance with an electrical signal. An electrical system according to the invention comprises a rugged structure suitable for extended periods of use in reliably positioning an element in accordance with an input electrical signal. Yet, initial cost and operating costs are relatively low. In addition, the system is relatively insensitive to undesired variations in circuit parameters.

Positioning an element in accordance with an electrical signal is well known and may be accomplished with many different types of apparatus. For example, a synchro is a device having an armature whose angular position may be slaved to follow the angular position of a master control unit. Still another technique for positioning an element involves sensing a signal representative of its position and comparing that signal with a signal representative of its desired position to provide an error signal. The error signal is then utilized to control a driving mechanism which positions the element until the sensed position coincides with that of the desired position.

The present invention has as an important object the provision of an electrical positioning device in which an electrical input signal establishes the position of an element.

Still another object of the invention is to utilize an electrically positionable device in accordance with the preceding object to proportionally control the power delivered to a load.

Still another object of the invention is to provide apparatus in accordance with the preceding objects in which the element is positioned in accordance with a digital code.

Still another object of the invention is to achieve the preceding objects with electrical transformers functioning as important elements in the system.

Still another object of the invention is to provide means for mechanically initiating selection of a position in accordance with the preceding objects in which a mechanically actuated command starts the conversion of a digital number representation of position into displacement of the element to the position digitally represented.

According to the invention, first means establish a first energy field along a prescribed path. Second means establish a second energy field along this path, the second field having oppositely sensed field components to develop oppositely directed forces between the first and second means due to the reaction between the first field and each of the components of the second field. The first and second means are arranged to permit relative movement parallel to the prescribed path to a relative position where the oppositely directed forces are substantially equal. A position selecting signal is applied to the second means to establish the boundary between the oppositely directed components of the first and second fields.

More specifically, the first means comprises an energized winding for establishing the first energy field. The second means comprises a plurality of windings spaced along a path parallel to the said predetermined path, the position selecting signal being coupled to a first end of each of the windings, the other end of each winding being coupled to a potential point, the potential at said other end of successive windings progressively increasing. As a result, the potential on the said one end determines the location of the boundary between the oppositely sensed components of the second field so that the first means winding becomes aligned over said boundary.

According to another feature of the invention, means are provided for converting a position stored in digital form into a relative position between the first and second means in response to a mechanically actuated command.

Numerous other features, objects and advantages of the invention will become apparent from the following specification when read in connection with the accompanying drawing in which:

FIG. 1 generally illustrates a system according to the invention;

Figure 1:
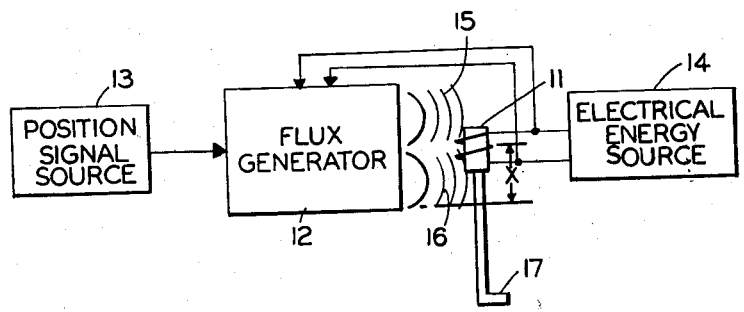

With reference now to the drawing and more particularly FIG. 1 thereof, there is shown a system incorporating the principles of the invention. The position of a winding 11 with respect to a predetermined point associated with a flux generator 12 is determined by the amplitude of a signal provided by a position signal source 13. The predetermined position is represented by the parameter $x$, corresponding to the vertical distance of the center point of the winding 11 above the lower edge of flux generator 12. The winding 11 is energized by an electrical energy source 14 which also delivers energy to the flux generator 12.

The energized winding 11 establishes a first magnetic field which reacts with the pair of oppositely sensed components 15 and 16 of the second magnetic field established by the flux generator 12. The boundary between components 15 and 16 corresponds essentially to a line passing through the center of winding 11 when the latter is stationary in a stable position.

A drawbar 17 is attached to winding 11 so that as the latter moves, drawbar 17 may be utilized to actuate an external device. The position selecting signal provided by source 13 has the effect of moving the boundary between the oppositely sensed components 15 and 16 to cause a corresponding displacement of winding 11 and the attached drawbar 17.

Figure 2:
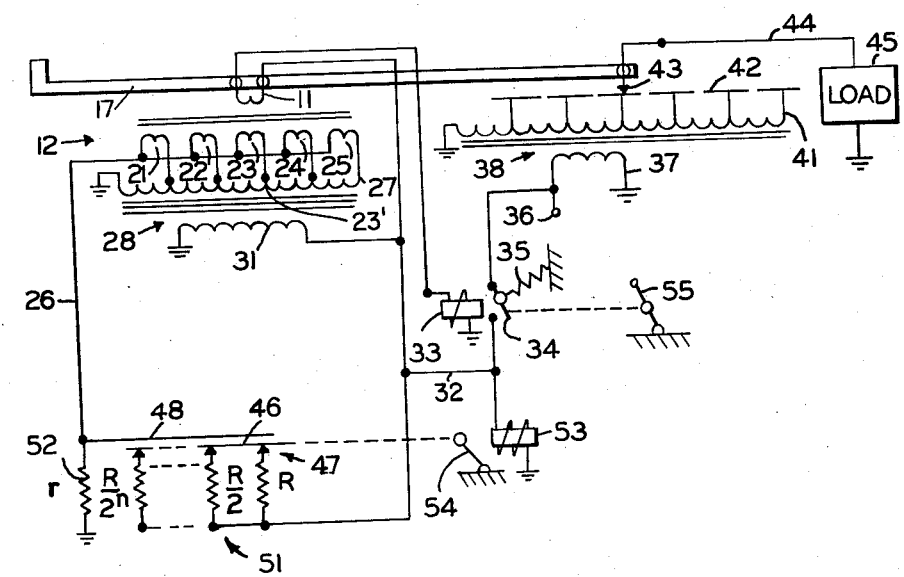
FIG. 2 is a schematic diagram of an embodiment according to the invention.

With reference to FIG. 2, there is shown a schematic diagram showing a system for establishing the desired fields and selectively positioning the boundary between the oppositely sensed field components. Where applicable, the same reference symbol identifies corresponding elements throughout the different figures in the drawing. Winding 11 is shown as being inductively coupled to windings 21–25 which function as flux generator 12. One end of each of the windings 21–25 is connected to line 26 which carries the position indicative signal. The other end of each of the windings 21–25 is connected to a respective tap on the secondary winding 27 of a transformer 28 so that each said other end of the consecutively arranged windings 21–25 is connected to a point of progressively increasing potential. One end of the secondary winding 27 is grounded.

The primary winding 31 of transformer 28 is connected to a comon energizing potential line 32. One end of winding 11 is also connected to line 32, the other end of that winding being coupled to ground through the winding of a holding relay 33. When holding relay 33 is energized, its arm 34 overcomes the force of spring 35 to couple the energizing potential on terminal 36 to line 32. Terminal 36 is energized by electrical energy source 14 (FIG. 1).

The primary winding 37 of a power transformer 38 is connected between terminal 36 and ground. One end of its secondary winding 41 is grounded. Secondary winding 41 is tapped, each tap being connected to a fixed contact like contact 42. The contacts 42 are arranged so that movement of drawbar 17 causes movable contact 43 to move toward another of the fixed contacts connected to the secondary winding 41 and thereby determine the voltage delivered over line 44 to load 45.

The magnitude of this voltage will be determined by the potential on line 26 and may correspond to a binarily encoded level on the punched card or paper 46. Openings in the paper or card 46 permit engagement of the contacts 47 with the fixed conducting plate 48. Each of the contacts which engages plate 48 direct-couples the potential on line 32 to line 26 through the associated one of resistors 51.

Resistors 51 comprise a digital attenuator which functions to convert the arrangement of openings in the card 46 into a potential on line 26, there being as many resistors 51 as there are binary digits in the numbers stored on punched card 46. The binary digit of least significance is associated with the resistor 51 of value R, the remaining digits being associated with resistors of value R divided by $2^n$, $n$ being the digit position with respect to the least significant digit. When all the resistors 51 are connected to the plate 48, the series resistance between lines 26 and 32 is large compared with the resistance $r$ of resistors 52 so that the potential source connected to line 32 in series with the connected ones of resistors 51 may be represented as a current source, the source current being proportional to the potential on line 32 divided by the value of the resistors 51 connected in parallel between line 32 and plate 48.

When line 32 is energized by arm 34 completing the circuit from terminal 36, a solenoid 53 is energized to move the arm 54 which in turn changes the position of card 46 so that another digital number may be decoded and converted into a potential on line 26. Arm 34 completes the circuit when lever 55, mechanically linked to arm 34, is manually or pedally depressed.

The preceding discussion of the physical arrangement should facilitate understanding the principles of operation. In describing the mode of operation, it is convenient to assume that lever arm 55 has just been depressed. This act energizes solenoid 53 and causes a new encoded digital number to enter between contacts 47 and the fixed contact 48. With arm 34 completing the circuit, line 32 is energized and the selected ones of resistors 51 deliver a current to resistor 52 to produce a potential on line 26 characteristic of the stored digital number. Assume that this potential equals the potential at the tap 23' of secondary winding 27 where the other end of winding 23 is connected. Then no current flows in winding 23 while the current flows into line 26 from windings 24 and 25, the current delivered by winding 25 being larger because its other end is connected to a point of higher potential along secondary winding 27. Windings 22 and 21 receive current from line 26 because each other end of these windings is connected to a tap on secondary winding 27 at a lower potential than the potential on line 26, the current through winding 21 being of greater magnitude than that through winding 22 because the potential difference between the other end of the former winding and line 26 is greater than that between the latter and the other end of winding 22. Under this condition, windings 21 and 22 establish a magnetic field of one sense which can link winding 11 while windings 24 and 25 establish a magnetic field component of opposite sense which also can link winding 11, the boundary between the two magnetic field components being opposite the center of winding 23.

Since winding 11 is energized from line 32, it establishes a magnetic field which reacts with the previously mentioned magnetic field which reacts with the previously mentioned magnetic field components to produce oppositely directed forces on winding 11 which become equal only when winding 11 is opposite winding 23. This position is then the stable position for winding 11 and drawbar 17 is thereby positioned accordingly so that movable contact 43 engages the contact on winding 41 shown and delivers an appropriate potential to load 45.

When winding 11 reaches the stable position, no net force is exerted thereon, a maximum counter E.M.F. is induced, and the current therein is a minimum. The reduction in current releases arm 34 to remove the potential from line 32.

Figure 3:
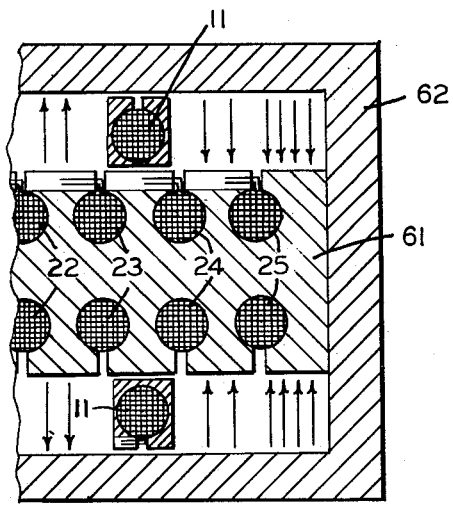
FIGS. 3 and 4 show sectional views through an exemplary structure defining the path of relative movement between a fixed and stationary element.

Referring to FIG. 3, there is shown a sectional view of an exemplary structure illustrating the physical relationship between winding 11 and flux generator 12. The sectional view shown best illustrates the constructional details and only a portion of a structure is shown so as not to obscure the principles. The structure may be cylindrically symmetrical having a center core 61 surrounded by a hollow shell 62, both being made of nonmagnetic material and the end of core 61 being in contact with the inside of the end face of the outer shell 62. Core 61 is formed with a plurality of annular openings for accommodating the windings 22, 23, 24 and 25, each annular opening communicating with an axial slot adjacent to the region outside the core to facilitate winding the coils mounted thereon.

Winding 11 is supported in a similar manner within an annular ring 63 coaxial about and slidable along core 61. Suitable means (not shown) are incorporated to establish connection with the associated elements shown schematically in FIG. 2. The arrows in the region between core 61 and shell 62 represent the sense and concentration of magnetic flux lines. As shown, winding 11 is aligned midway between oppositely sensed equal magnitude flux concentrations in a position between windings 23 and 24.

Figure 4:
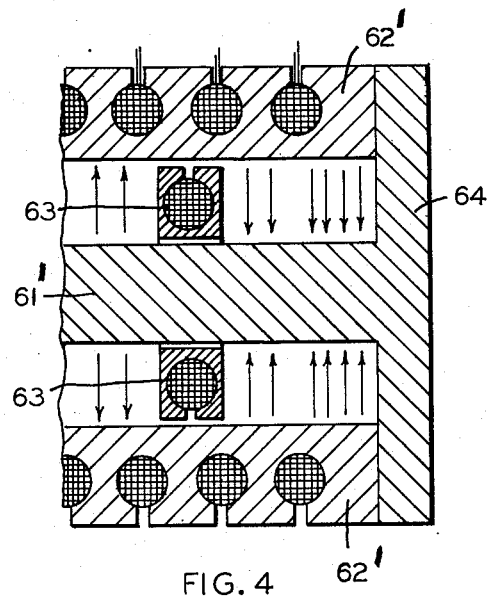

Referring to FIG. 4, there is shown a variation of the construction of FIG. 3 in which the stator windings 23, 24 and 25 are in the shell 62' while the center core 61' is a part of a spool having an end hub 64 functioning in the same manner as the end face of the outside shell 62 shown in FIG. 3. Winding 11 is still supported within an annular opening in an annular ring 63' coaxial about and slidable along core 61'.

Figures 5, 6:
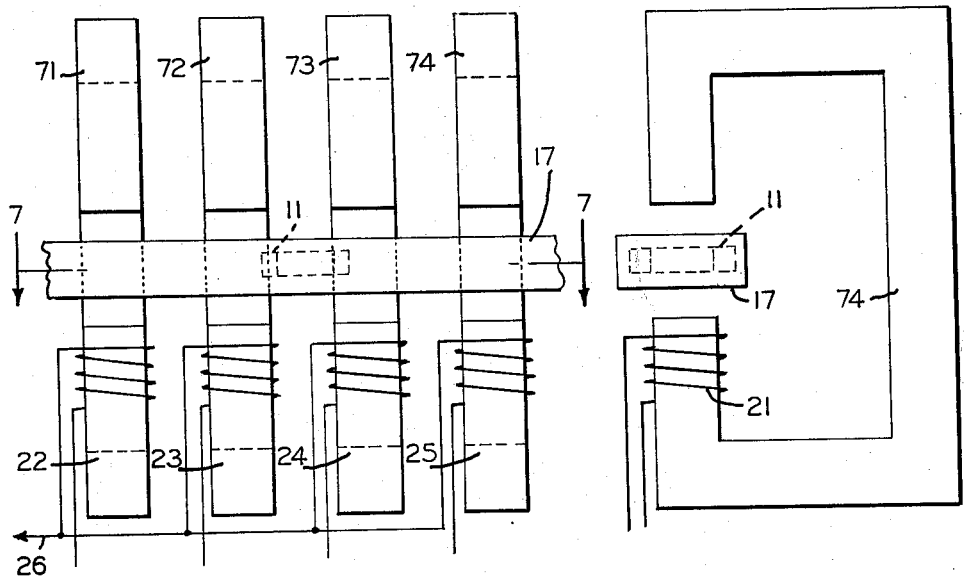
FIGS. 5–7 and 8–9 show two other embodiments of such structure.
Figure 7:
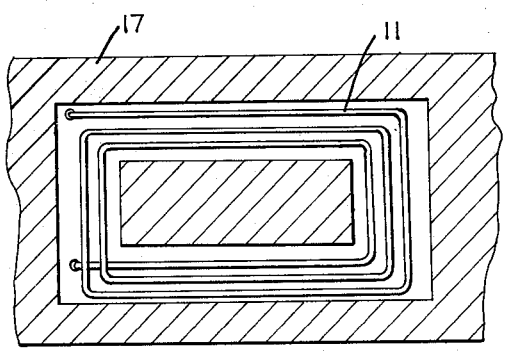

Referring to FIG. 5 there is illustrated another embodiment of the structure including the relatively movable windings. The windings are supported by structures of high magnetic permeability to provide high electromechanical conversion efficiency. Each of the illustrated windings 22–25 is shown surrounding respective C-shaped cores 71–74. The opposed pole faces of each core are aligned on opposite sides of the path traversed by drawbar 17, an end view of the arrangement being shown in FIG. 6. FIG. 7 is a sectional view through section 7—7 of FIG. 5 to illustrate the arrangement of winding 11 in drawbar 17.

Figure 8:
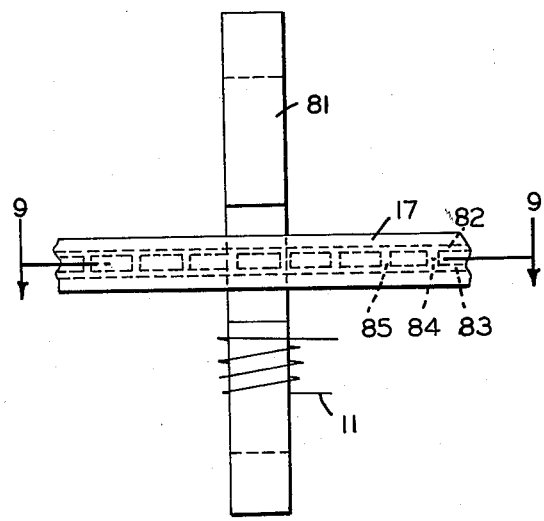
Figure 9:
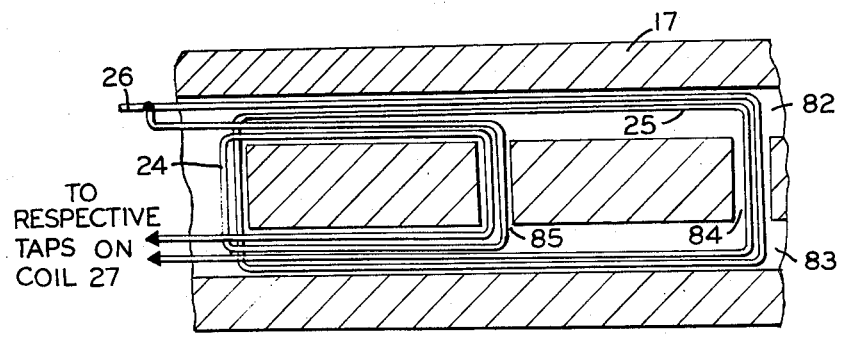

Referring to FIG. 8, there is shown another embodiment of the invention in which the winding 11 is stationary and wound upon a C-shaped core of magnetic material with the windings 21–25 being supported within drawbar 17. A horizontal view of some of the latter windings illustrative of their physical arrangement in drawbar 17 is shown in FIG. 8. Only two of the windings are shown in order to avoid obscuring the winding arrangement. Windings 24 and 25 enclose a common area, but the winding 25 additionally encloses an area to the right of winding 24 so that the flux in the latter area is determined by the current in winding 25 while the flux in the common area is related to the current in winding 24. The longitudinal portions of the windings are in the longitudinal grooves 82 and 83 while a transverse portion of windings 24 and 25 are in transverse grooves 85 and 84 respectively. With this arrangement, the current in winding 11 is a maximum when drawbar 17 reaches its stable position.

The electrically positionable device according to the invention has a number of advantages. The position of winding 11 corresponds to the potential on line 26 so that the invention may be used for analog-to-analog conversion as well as digital-to-analog conversion. The parts of the system are relatively low in cost and relatively easy to fabricate and assemble. Successive conversions may be rapidly effected. The taps 42 on secondary winding 41 may be unevenly positioned along the winding so that the potential at contact 43 is a predetermined nonlinear function of the displacement of drawbar 17.

Numerous other uses of, modifications of and departures from the specific embodiments disclosed herein may be practiced by those skilled in the art without departing from the inventive concepts. Consequently, the invention is to be construed as limited only by the spirit and scope of the appended claims.

What is claimed is:

1. Electrically positionable apparatus comprising, first means for establishing a first energy field along a prescribed path, second means for establishing a second energy field along said path, said second field having oppositely sensed components to develop oppositely directed forces between said first and second means due to the reaction between said first field and each of said components, means for supporting said first and second means to permit relative movement along said path to a relative position where said oppositely directed forces are substantially equal, a source of a position selecting signal, and means for applying said position selecting signal to said second means to establish the boundary between said oppositely directed components and cause said first and second means to move to a relative position along said path represented by said position selecting signal.

2. Apparatus in accordance with claim 1 wherein said first means comprises a coil, and said second means comprises a plurality of coils spaced along a path parallel to said prescribed path, a first end of each second means coil being coupled to said position selecitng signal source, a source of different potentials, and means for applying respective ones of said different potentials progressively to the other end of a respective second means coil successively.

3. Apparatus in accordance with claim 2 wherein all of said coils have a common axis generally parallel to said prescribed path.

4. Apparatus in accordance with claim 2 wherein the axes of said coils are generally parallel to each other and generally perpendicular to said prescribed path.

5. Apparatus in accordance with claim 4 wherein said first means coil is supported with a movable drawbar of magnetic material, and said second means coils are wound upon respective C-shaped cores of magnetic material, each core having opposed pole faces separated by said prescribed path, said drawbar being movable along said path.

6. Apparatus in accordance with claim 4 wherein said first means coil is wound upon a C-shaped core of magnetic material, said core having opposed pole faces separated by said prescribed path, and said second means coils are supported within a movable drawbar of material, said second means coils establishing respective magnetic fields spaced along the length of said drawbar, said drawbar being movable along said path.

7. Apparatus in accordance with claim 2 and further comprising, a source of A.-C. energy, a first transformer energized with said A.-C. energy having spaced taps and comprising said source of different potentials, said other ends of successive second means coils being respectively coupled to consecutive ones of said spaced taps, and means for applying said A.-C. energy to said first means coil.

8. Apparatus in accordance with claim 7 and further comprising, means responsive to said first and second means attaining said relative position where said oppositely directed forces are substantially equal for interrupting the delivery of said A.-C. energy to said first coil and said first transformer, and selective means for restoring the delivery of said A.-C. energy to said first means coil and said first transformer.

9. Apparatus in accordance with claim 8 and further comprising, a digital attenuator for selectively attenuating said A.-C. energy in accordance with a digital number to provide a digitally attenuated signal, and means for applying said digitally attenuated signal to all said one ends of said second means coils.

10. Apparatus in accordance with claim 9 and further comprising, means for storing a sequence of digital numbers and controlling said digital attenuator with one digital number in said sequence, and means for selectively advancing said storing means to control said digital attenuator with the next digital number in said sequence.

11. Apparatus in accordance with claim 6 wherein said second means coils comprise a sequence of coils surrounding progressively increasing cross-sectional areas, each of said areas embracing the cross-sectional area surrounded by the preceding coil in said sequence, means for maintaining one end of each of said coils at the potential of said position signal selecting source, and means for maintaining the other end of each of said coils at a respective one of said different potentials.

References Cited in the file of this patent

UNITED STATES PATENTS

| | | |
|---|---|---|
| 1,896,418 | Phelps | Feb. 7, 1933 |
| 1,986,639 | Konn | Jan. 1, 1935 |
| 2,030,606 | Norris | Feb. 11, 1936 |
| 2,734,155 | Shuck | Feb. 7, 1956 |
| 2,780,768 | Sealy | Feb. 5, 1957 |
| 2,962,652 | Bulliet et al. | Nov. 29, 1960 |
| 2,968,737 | Cosar | Jan. 17, 1961 |